C. D. Rowell,
Plow Coulter.

No. 93,011.    Patented July 27, 1869.

WITNESS
W. M. Honor.
John S. Henck

INVENTOR
G. D. Rowell
By his Atty

UNITED STATES PATENT OFFICE.

G. D. ROWELL, OF MENOMONEE FALLS, WISCONSIN.

IMPROVEMENT IN ADJUSTABLE MOLD-BOARDS AND COLTERS.

Specification forming part of Letters Patent No. 93,011, dated July 27, 1869.

*To all whom it may concern:*

Be it known that I, G. D. ROWELL, of Menomonee Falls, county of Waukesha, and State of Wisconsin, have invented a new and useful Improvement in Plow-Colters and Mold-Boards; and I do hereby declare that the folfowing is a full, clear, and exact description thereof, which will enable those skilled in the art to make and use the same, reference being had to the accompanying drawings, forming part of this specification, in which—

Figure 1:
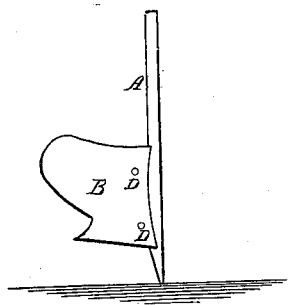
Figure 2:
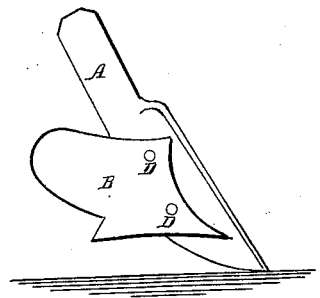
Figure 3:
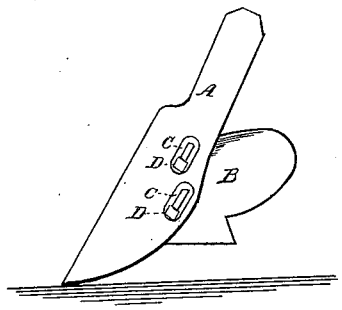

Figure 1 is a front view of my invention; Fig. 2, a side view with the mold-board; and Fig. 3, a side view of the landside.

Similar letters of reference in each of the figures indicate corresponding parts.

The object of my invention is to produce a plow-colter and mold-board, to be placed in advance of a plow to cut down into the earth, and the mold-board turns over the grass or stubble, so that when the mold-board of the plow proper turns over the ground the grass or stubble shall be completely covered.

A is the colter; B, the mold-board; C, slots cut in the colter, so that the mold-board may be raised or lowered, so that the point of the colter may cut deeper or lighter, as may be desired. The colter itself may be adjustable in the plow-beam. D, bolts which hold the mold-board to the colter.

Operation: Put the colter into the plow-beam forward of a plow; adjust it as may be desired; then adjust the mold-board as may be desired, and your plow is ready for use.

What I claim as my invention, and desire to secure by Letters Patent, is—

A colter and mold-board consisting of colter A, mold-board B, slots C, and bolts D, substantially as described.

G. D. ROWELL.

Witnesses:
 JOHN H. FERTIG,
 C. K. SCHLAFER.